United States Patent
Suzuki et al.

(10) Patent No.: US 6,798,451 B1
(45) Date of Patent: Sep. 28, 2004

(54) SOLID-STATE IMAGE PICKUP DEVICE AND METHOD FOR DRIVING THE SAME

(75) Inventors: Ryoji Suzuki, Kanagawa (JP); Takahisa Ueno, Kanagawa (JP); Koichi Shiono, Kanagawa (JP); Kazuya Yonemoto, Tokyo (JP)

(73) Assignee: Sony Corporation (JP)

( * ) Notice: Subject to any disclaimer, the term of this patent is extended or adjusted under 35 U.S.C. 154(b) by 746 days.

(21) Appl. No.: 09/612,654

(22) Filed: Jul. 7, 2000

(30) Foreign Application Priority Data

Jul. 9, 1999 (JP) .......................................... P11-195270

(51) Int. Cl.$^7$ .......................... H04N 5/335; H01L 27/00; H01L 29/768
(52) U.S. Cl. ...................... 348/294; 250/208.1; 257/215
(58) Field of Search ................................ 348/281–283, 348/294, 302, 311, 315, 316; 250/208.1; 257/215, 242

(56) References Cited

U.S. PATENT DOCUMENTS

| | | | | |
|---|---|---|---|---|
| 4,237,477 A | * | 12/1980 | Weimer ....................... | 348/282 |
| 4,841,369 A | * | 6/1989 | Nishizawa et al. ......... | 348/302 |
| 4,910,588 A | * | 3/1990 | Kinoshita et al. ............ | 348/311 |
| 5,324,944 A | * | 6/1994 | Soch et al. ............... | 250/338.3 |
| 5,345,266 A | | 9/1994 | Denyer | |
| 5,631,704 A | * | 5/1997 | Dickinson et al. ........... | 348/294 |
| 5,721,422 A | * | 2/1998 | Bird ........................ | 250/208.1 |
| 5,991,467 A | * | 11/1999 | Kamiko ................... | 250/208.1 |
| 6,037,577 A | * | 3/2000 | Tanaka et al. ............ | 250/208.1 |
| 6,166,768 A | * | 12/2000 | Fossum et al. ............. | 348/302 |
| 6,181,375 B1 | * | 1/2001 | Mitsui et al. ................ | 348/281 |
| 6,466,266 B1 | * | 10/2002 | Guidash et al. ............. | 348/308 |

* cited by examiner

*Primary Examiner*—Andrew Christensen
*Assistant Examiner*—Nhan Tran
(74) *Attorney, Agent, or Firm*—Rader, Fishman & Grauer PLLC; Ronald P. Kananen

(57) ABSTRACT

A solid-state image pickup device including a matrix of unit pixels, each unit pixel including five transistors, a plurality of horizontal signal lines wired on a row-by-row basis and a vertical signal line commonly wired for the plurality of the horizontal signal lines. A reset transistor resets a floating diffusion region FD, and the reset level of the reset transistor is output to the horizontal signal lines through an amplifying transistor. In succession, a signal charge of a photodiode is read out into the floating diffusion region FD through a read out transistor, and the signal level based on the signal charge is output to the horizontal signal lines through the amplifying transistor.

7 Claims, 9 Drawing Sheets

SOLID-STATE IMAGE PICKUP DEVICE AND METHOD FOR DRIVING THE SAME

BACKGROUND OF THE INVENTION

1. Field of the Invention

The present invention relates to solid-state image pickup devices and a method for driving the solid-state image pickup device, and, more particularly, to an X-Y addressing type solid-state image pickup device having an amplification capability at each pixel unit, and a method for driving the same.

2. Description of the Related Art

FIG. 11 shows one of known conventional solid-state image pickup devices, such as the one disclosed in U.S. Pat. No. 5,345,266. The solid-state image pickup device includes a matrix of unit pixels 101 two-dimensionally arranged. A vertical scanning circuit 102 selects rows through vertical scan selection lines 103. A column amplifier 105 is connected to each of vertical signal lines 104. A pixel signal of each unit pixel 101 is stored in the respective column amplifier 105 on a row-by-row basis, while a horizontal scanning circuit 106 selects columns. The solid-state image pickup device thus outputs the signal thereof through a horizontal signal line 107 and a sense amplifier 108.

In the solid-state image pickup device having the above construction, a signal charge for 1H (one horizontal scanning period) is sent to the column amplifiers 105 at one time. The signal charge is once stored in the column amplifier 105 and is then read out. A capacitor of the column amplifier 105 stores a signal, the magnitude of which is subject to variations in a reset level of the column amplifier 105. As a result, variations in characteristics of transistors used in each column amplifier 105 is superimposed on the signal, and appear as a vertical streak, fixed pattern noise (FPN) on screen.

To suppress the vertical streak, fixed noise pattern, a noise canceling circuit using a frame memory is arranged external to the device. The noise canceling circuit stores in advance one of an output signal during a dark period (a noise component) and an output signal during a light time (a video component) in the frame memory on a pixel by pixel basis, and performs an extraction operation between the one output signal and the other output signal to remove the noise component due to the variations in the transistor characteristics. In a camera system using a solid-state image pickup device, the noise canceling circuit using the frame memory needs to be mounted external to the device, and the size of the camera system becomes bulky accordingly.

SUMMARY OF THE INVENTION

Accordingly, it is an object of the present invention to provide a solid-state image pickup device that removes a fixed pattern noise and a method for driving the image pickup device.

A solid-state image pickup device of the present invention includes a matrix of unit pixels, and each unit pixel includes a photoelectric converter, and five transistors of a read out transistor, a read out selection transistor, an amplifying transistor, a reset transistor, and an output selection transistor. A plurality of horizontal signal lines are wired to the unit pixels, each on a row-by-row basis, and a single vertical signal line is commonly wired to these horizontal signal lines. The solid-state image pickup device further includes a vertical drive unit which selects the pixels on a row-by-row basis while successively outputting, to the vertical signal line, pixel signals which are output by the pixels to the plurality of the horizontal signal lines, and a horizontal drive unit which feeds a horizontal selection pulse to the read out selection transistor and the output selection transistor at the unit pixel while feeding a reset pulse to the reset transistor.

With the above arrangement, when the vertical drive unit selects one row, the horizontal drive unit feeds a reset pulse to the reset transistor to reset the storage unit, and the reset level by the reset transistor is output to the horizontal signal line through the amplifying transistor. In succession, a horizontal scanning pulse is fed to the read out selection transistor, which then reads out the signal charge photoelectrically converted by the photoelectric converter and stored, into the storage unit. The signal charge is then amplified through the amplifying transistor and is then output to the horizontal signal line as the signal level. The reset level and the signal level are thus fed to the vertical signal line through the horizontal signal line in a point-at-a-time scanning manner.

DESCRIPTION OF THE PREFERRED EMBODIMENTS

Figure 1:
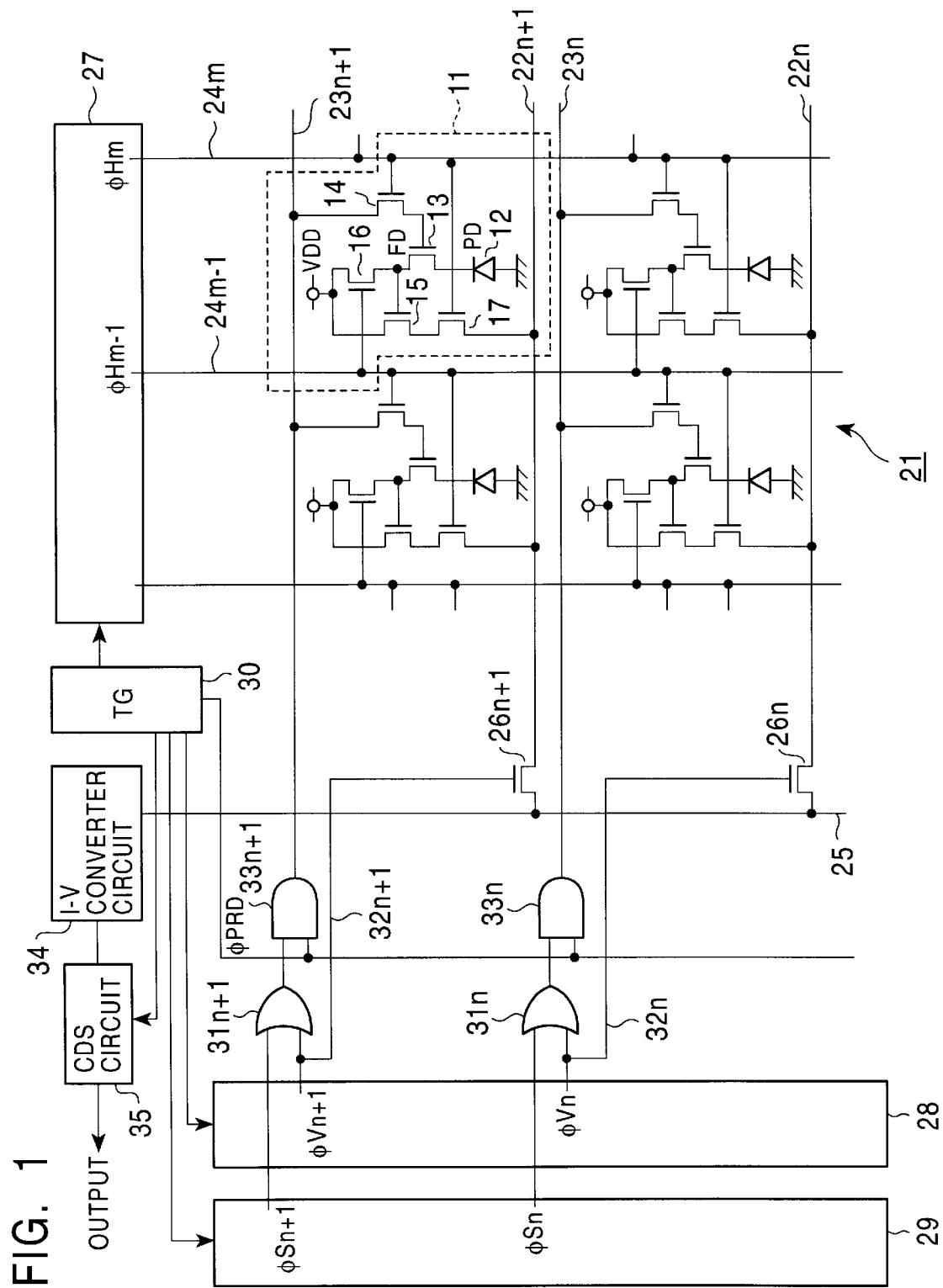
FIG. 1 is a block diagram showing a solid-state image pickup device of a first embodiment of the present invention.

The embodiments of the present invention are now discussed, referring to the drawings. FIG. 1 is a block diagram showing a solid-state image pickup device of a first embodiment of the present invention. The solid-state image pickup device of the present embodiment is an X-Y addressing type image pickup device having an electronic shutter function. The electronic shutter of the X-Y addressing type image pickup device is released on a row by row (line by line) basis, unlike a CCD (Charged Coupled Device).

Referring to FIG. 1, a boxed area enclosed by dotted lines represents a unit pixel 11. The unit pixel 11 includes a photodiode (PD) 12 as a photoelectric converter, and five N-channel MOS transistors of a read out transistor 13, a read out selection transistor 14, an amplifying transistor 15, a reset transistor 16, and an output selection transistor 17. The unit pixels 11, arranged in a matrix, form a pixel assembly 21.

For simplicity of the figure, the pixel assembly 21 has a pixel arrangement of two columns ((m−1)-th column and m-th column) by two rows (n-th row and (n+1)-th row). The pixel assembly 21 includes horizontal signal lines 22n+1 and 22n and read out lines 23n+1 and 23n on a row-by-row basis. Horizontal selection lines 24m−1 and 24m are wired on a column by column basis.

In the unit pixel 11 of m-th column and (n+1)-th row, the photodiode 12 has a photoelectric conversion function and a charge storage function. Specifically, the photodiode 12 photoelectrically converts an incident light ray into a signal charge responsive to the light intensity of the incident light, and stores the signal charge. The photodiode 12 has an embedded diode sensor structure such as a hole accumulated diode (HAD) structure constructed of a hole accumulated layer $p^+$ on the surface of an np diode.

A source of the read out transistor 13 is connected to a cathode of the photodiode 12. The read out transistor 13 is configured with the drain thereof connected to a floating diffusion region FD and with the gate thereof connected to the source/drain of the read out selection transistor 14. The read out selection transistor 14 is configured with the drain/source thereof connected to the read out line 23n+1 and with the gate thereof connected to the horizontal selection line 24m. The amplifying transistor 15 is configured with the gate thereof connected to the floating diffusion region FD and the drain thereof connected to a power source VDD.

The reset transistor 16 is configured with the source thereof connected to the floating diffusion region FD, with the drain thereof connected to the power source VDD, and with the gate thereof connected to a horizontal signal line 24m−1 at an adjacent (m−1)-th column. The reset transistor 16 is of a depletion type for resetting the floating diffusion region FD to the power source VDD. The output selection transistor 17 is configured with the drain thereof connected to the source of the amplifying transistor 15, with the source thereof connected to the horizontal signal line 22n+1, and with the gate thereof connected to the horizontal selection line 24m.

A single vertical signal line 25 is wired in a direction perpendicular to a plurality of horizontal lines, i.e., the horizontal signal lines 22n and 22n+1 of two rows in this case. Vertical selection transistors 26n and 26n+1 are respectively arranged between the horizontal signal lines 22n and 22n+1 and the vertical signal line 25. The vertical selection transistors 26n and 26n+1 are also fabricated of N-channel MOS transistors.

Arranged in a peripheral portion of the pixel assembly 21 are a horizontal scanning circuit 27 as a horizontal drive system for column selection, a vertical scanning circuit 28 for row selection, and an electronic shutter scanning circuit 29 as a vertical drive system for controlling a storage time (exposure time), which is an integer multiple of 1H (a scanning horizontal period). The scanning circuits 27, 28, and 29 are constructed of shift registers, for instance, and start shift operations (scanning) in response to a drive pulse provided by a timing generator (TG) 30.

The horizontal scanning circuit 27 successively outputs horizontal scanning (selection) pulses $\phi$Hm-1 and $\phi$Hm. The horizontal scanning pulses $\phi$Hm-1 and $\phi$Hm are respectively fed to the gate of the reset transistor 16 and to the gates of the read out selection transistor 14 and the output selection transistor 17, respectively through the horizontal selection lines 24m−1 and 24m.

The vertical scanning circuit 28 successively outputs vertical scanning pulses $\phi$Vn and $\phi$Vn+1 and the electronic shutter scanning circuit 29 successively outputs shutter pulses $\phi$Sn and $\phi$Sn+1. The vertical scanning pulses $\phi$Vn and $\phi$Vn+1 are respectively fed to OR gates 31n and 31n+1 at the input terminals thereof, row by row, and are also respectively fed to the gates of the vertical selection transistors 26n and 26n+1 through vertical selection lines 32n and 32n+1.

The shutter pulses $\phi$Sn and $\phi$Sn+1 are fed to OR gates 31n and 31n+1 at the other input terminals, row by row. The outputs of the OR gates 31n and 31n+1 are respectively fed to AND gates 33n and 33n+1 at the input terminals. A read out pulse $\phi$PRD, generated by the timing generator 30, is fed to the other terminals of the AND gates 33n and 33n+1. The outputs of the AND gates 33n and 33n+1 are fed to the drain/source of the read out selection transistor 14 at each pixel through the read out lines 23n and 23n+1.

Arranged on the output terminal of the vertical signal line 25 are an I (current)- V (voltage) converter circuit 34 and a correlated double sampling (hereinafter referred to as CDS) circuit 35 as a differential circuit. The I-V converter circuit 34 converts the pixel signal supplied in the form of signal current through the vertical signal line 25 into a signal voltage and feeds the signal voltage to the CDS circuit 35.

The CDS circuit 35 determines a difference between a noise level immediately subsequent to pixel resetting and a signal level, in response to a sampling pulse provided by the timing generator 30. An AGC (Automatic Gain Control) circuit or an ADC (Analog to Digital Converter) circuit may be connected to the CDS circuit 35 as a successive stage thereof, as necessary.

Figure 2:
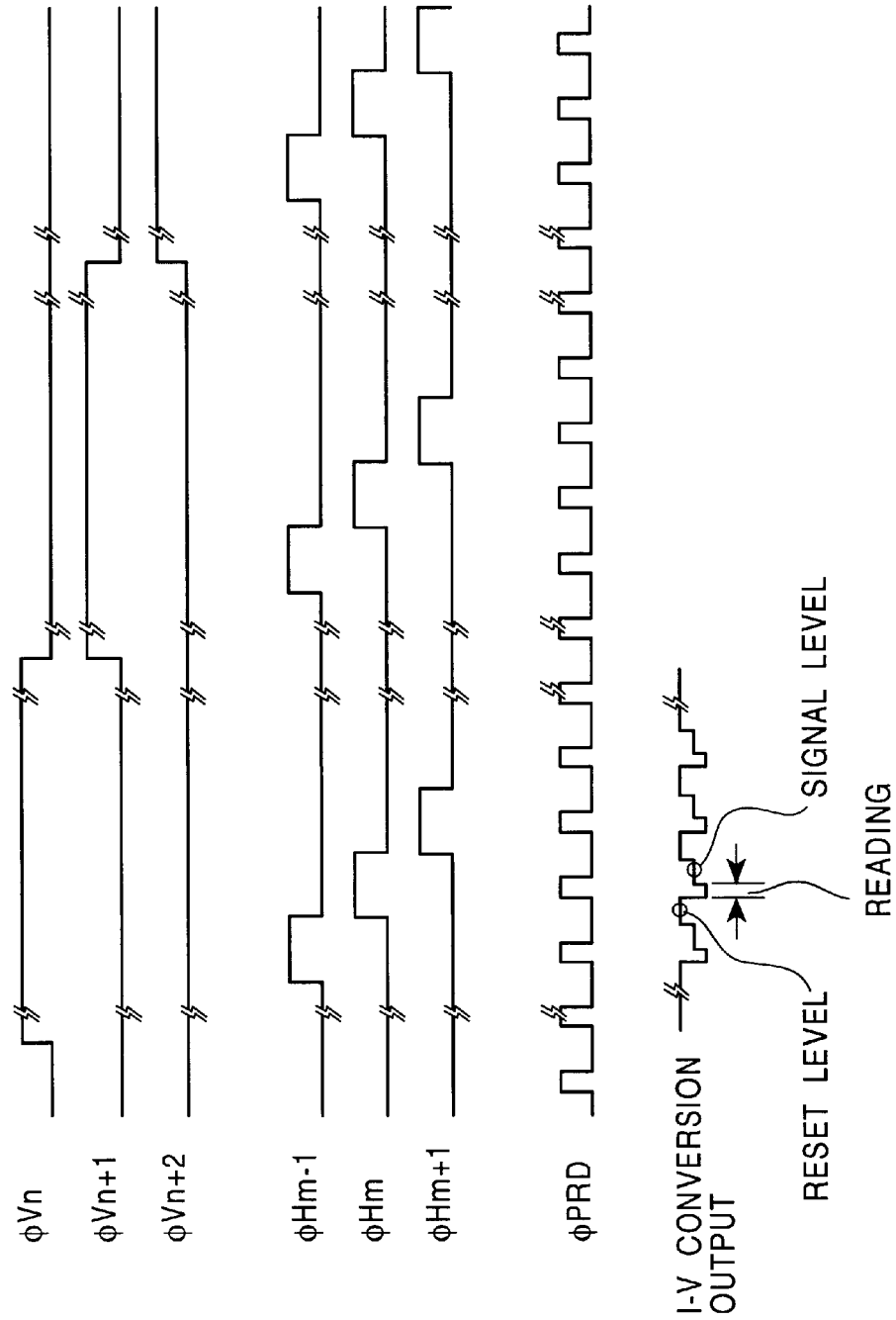
FIG. 2 is a timing diagram showing an electronic shutter in the inoperative state thereof in the solid-state image pickup device of the first embodiment.
Figure 3:
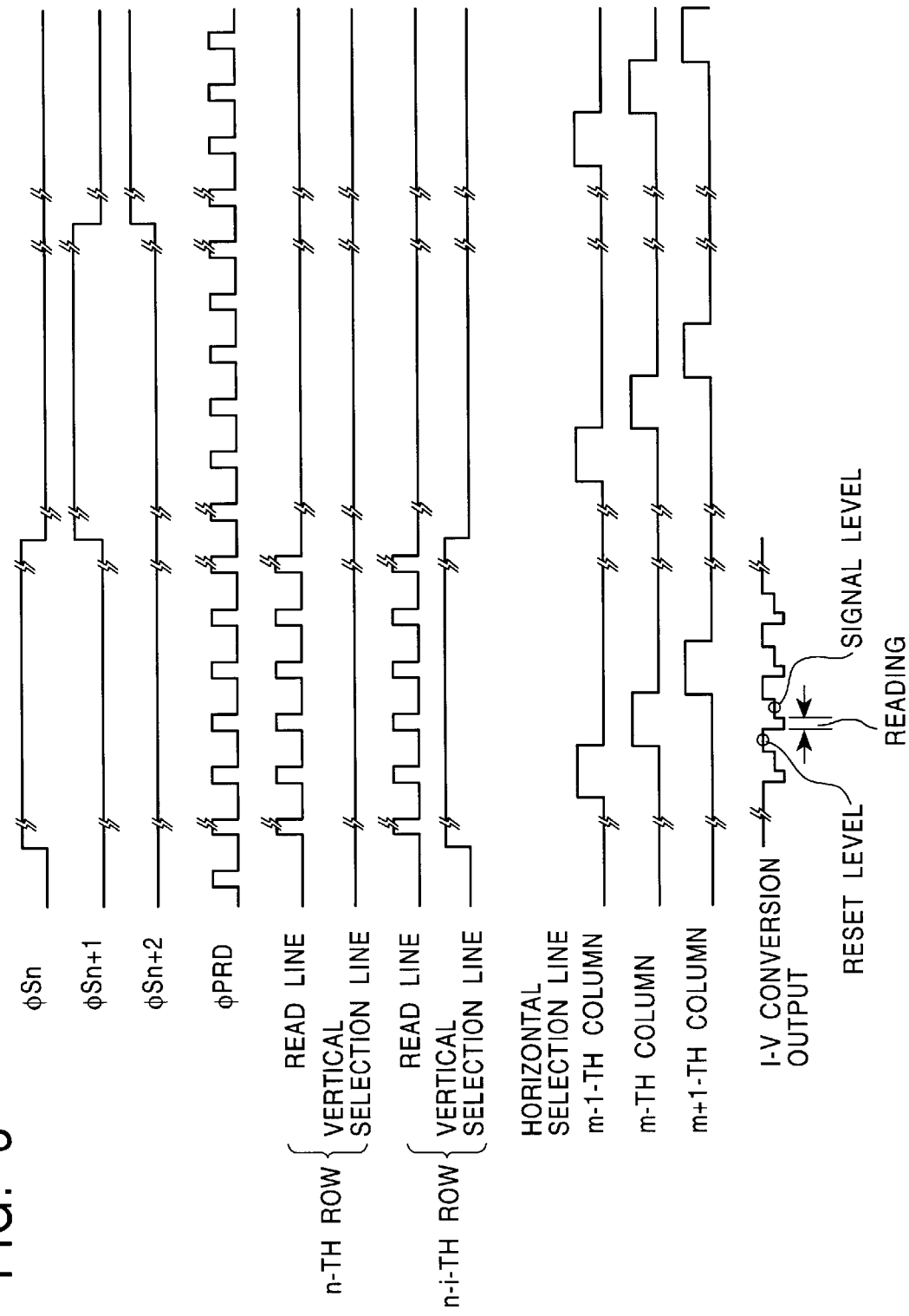
FIG. 3 is a timing diagram showing the electronic shutter in the operative state thereof in the solid-state image pickup device of the first embodiment.

The operation of the solid-state image pickup device of the first embodiment is now discussed, referring to timing diagrams shown in FIG. 2 and FIG. 3. FIG. 2 is the timing diagram with an electronic shutter in the inoperative state thereof. FIG. 3 is a timing diagram with the electronic shutter in the operative state thereof.

Focusing on the pixel at the m-th column and the n-th row with the electronic shutter in the inoperative state thereof, the vertical scanning circuit 28 outputs the vertical scanning pulse $\phi$Vn in the vertical scanning operation thereof, thereby feeding the vertical scanning pulse $\phi$Vn to the vertical selection transistor 26n at the n-th row. The n-th row is thus selected as a read out row.

In this state, the horizontal scanning circuit 27 outputs the horizontal scanning pulse $\phi$Hm-1 in the horizontal scanning operation thereof, thereby outputting the horizontal scanning pulse $\phi$Hm-1 to the horizontal selection line 24m−1 at the (m−1)-th column. The reset transistor 16 at the m-th column is thus turned on. The floating diffusion region FD is thus reset to the power source VDD through the reset transistor 16. The horizontal scanning pulse $\phi$Hm-1 at the (m−1)-th column thus functions as a reset pulse for the adjacent m-th column.

When the horizontal scanning circuit 27 outputs the horizontal scanning pulse $\phi$Hm to the horizontal selection line 24m at the m-th column, the output selection transistor 17 at the pixel on the m-th column is turned on. In this way, a current, responsive to a result level of the pixel (m, n) reset in the selected n-th row and the selected m-th column, is thus output through the horizontal signal line 22n and the vertical selection transistor 26n to the vertical signal line 25.

The read out pulse φPRD is output during the generation of the horizontal scanning pulse φHm, and is AND-gated with the vertical scanning pulse φVn at the AND gate 33n. As a result, a pulse is generated at the read out line 23n at the n-th row. The read out selection transistor 14 at the pixel (m, n) is turned on because the horizontal scanning pulse φHm is applied to the gate thereof.

The read out pulse φPRD applied to the read out line 23n is applied to the gate of the read out transistor 13 through the drain-source of the read out selection transistor 14. The read out transistor 13 is thus turned on, and the signal charge generated and stored by the photodiode 12 through photoelectric conversion is read out into the floating diffusion region FD through the read out transistor 13.

When the read out pulse φPRD ends, the read out transistor 13 is turned off. The signal charge, read out into the floating diffusion region FD, is amplified by the amplifying transistor 15 into a signal current. The signal current is then output to the vertical signal line 25 through the output selection transistor 17, the horizontal signal line 22n, and the vertical selection transistor 26n.

During the selection of the pixel (m, n), the pixel (m+1, n) is reset by the horizontal scanning pulse φHm. When the vertical scanning pulse φHm ends, followed by the output of the horizontal scanning pulse φHm+1 from the horizontal scanning circuit 27, the pixel (m+1, n) at the next column is selected.

Through the series of steps discussed above, the reset levels and the signal levels of unit pixels 11 of one line at the n-th row are read out to the vertical signal line 25 through the same path (composed of the horizontal signal line 22n and the vertical selection transistor 26n) on a point-at-a-time scanning basis. The levels are then converted from current to voltage through the I-V converter circuit 34 and are then sent to the CDS circuit 35 for noise canceling through correlated double sampling.

Referring to the timing diagram shown in FIG. 3, the electronic shutter operation is discussed, with the pixels at the n-th row being treated as electronic shutter pixels and the pixels at the (n-i)-th row (i is a natural number) being treated as a selected pixel row (a signal read out pixel row). The storage time is 1H×i.

The electronic shutter scanning circuit 29 outputs the shutter pulse φS. The shutter pulse φS is routed through the OR gate 31n and is AND-gated with the read out pulse φPRD generated by the timing generator 30 at the AND gate 33n. In this way, the n-th row is enabled to be selected as a shutter row. Each time the read out pulse φPRD is output, a pulse appears on the read out line 23n at the n-th row.

No pulse appears on the vertical selection line 32n at the n-th row. The vertical scanning circuit 28 outputs a vertical scanning pulse φVn-i to the gate of a vertical selection transistor 26n-i at an (n-i)-th row, thereby enabling the (n-i)-th row to be selected. The vertical scanning pulse φVn-i, routed through the OR gate 31n-i, is AND-gated with the read out pulse φPRD, generated by the timing generator 30, at the AND gate 33n-i. Each time the read out pulse φPRD is output, a pulse appears at the read out line 23n-i at the (n-i)-th row.

In this state, the horizontal scanning circuit 27 in the scanning operation thereof outputs a horizontal scanning pulse φHm-1 to a horizontal selection line 24m-1 at an (m-1)-th column, and the reset transistors 16 are turned on at an m-th column. In this way, the floating diffusion region FD in each pixel is reset to the power source VDD through the reset transistor 16.

In succession, the horizontal scanning circuit 27 outputs a horizontal scanning pulse φHm to a horizontal selection line 24m at the m-th column, and the output selection transistors 17 at the m-th column are turned on. A current, responsive to a reset level of a pixel (m, n-i) reset in the selected (n-i)-th row and in the selected m-th column, is output to the vertical signal line 25 through the horizontal signal line 22n-i and the vertical selection transistor 26n-i.

Since the vertical selection transistor 26n at the n-th row remains off, a current responsive to the reset level of the pixel (m, n) is not output to the vertical signal line 25.

The read out pulse φPRD is output during the generation of the horizontal scanning pulse φHm, and is AND-gated with the vertical scanning pulse φVn-i at the AND gate 33n-i. As a result, a pulse is generated at the read out line 23n-i at the (n-i)-th row. The read out selection transistor 14 at the pixel (m, n-i) is turned on because the horizontal scanning pulse φHm is applied to the gate thereof.

The read out pulse φPRD applied to the read out line 23n-i at the pixel (m, n-i) is applied to the gate of the read out transistor 13 through the drain-source of the read out selection transistor 14. The read out transistor 13 is thus turned on, and the signal charge generated and stored by the photodiode 12 through photoelectric conversion is read out into the floating diffusion region FD through the read out transistor 13.

The read out pulse φPRD is AND-gated with the shutter pulse φSn at the AND gate 33n, and as a result, a resulting pulse appears on the read out line 23n at the n-th row. The read out selection transistor 14 at the pixel (m, n) is turned on because the horizontal scanning pulse φHm is applied to the gate thereof.

The read out pulse φPRD applied to the read out line 23n at the pixel (m, n) is applied to the gate of the read out transistor 13 through the drain-source of the read out selection transistor 14. The read out transistor 13 is thus turned on, and the signal charge generated and stored by the photodiode 12 through photoelectric conversion is read out into the floating diffusion region FD through the read out transistor 13.

When the read out pulse φPRD ends, the read out transistors 13 of the pixel (m, n) and the pixel (m, n-i) are turned off. The signal charge, read out into the floating diffusion region FD at the pixel (m, n-i), is amplified by the amplifying transistor 15 into a signal current. The signal current is then output to the vertical signal line 25 through the output selection transistors 17, the horizontal signal line 22n-i, and the vertical selection transistor 26n-i.

Since the vertical selection transistor 26n at the n-th row remains off, a current responsive to the quantity of the signal charge at the pixel (m, n) is not output to the vertical signal line 25. The signal charge stored in the photodiode 12 at the pixel (m, n) is transferred to the floating diffusion region FD and is thus emptied, and a new charging starts over.

During the selection of the pixel (m, n-i), a pixel (m+1, n-i) at the next column is reset by the horizontal scanning pulse φHm. When the horizontal scanning pulse φHm ends, followed by the output of the horizontal scanning pulse φHm+1 by the horizontal scanning circuit 27, the pixel (m+1, n-i) at the next column is selected.

Figure 4:
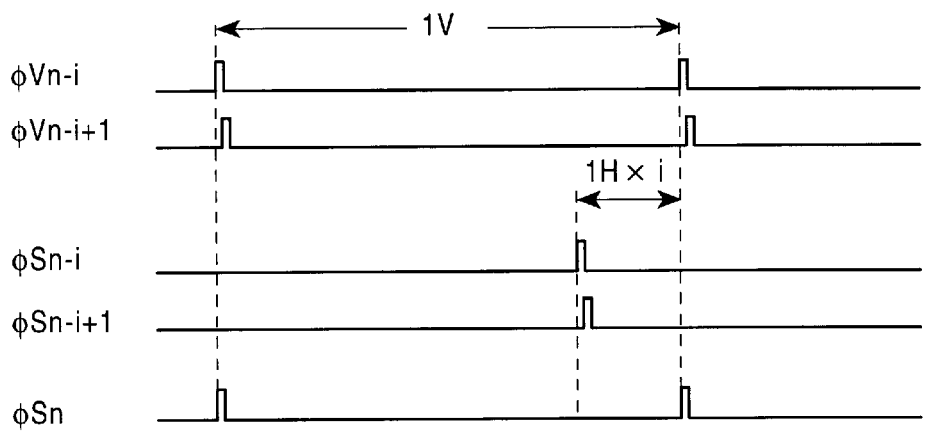
FIG. 4 is a timing diagram showing the relationship between the operation of the electronic shutter and the exposure time thereof.
Figure 5:
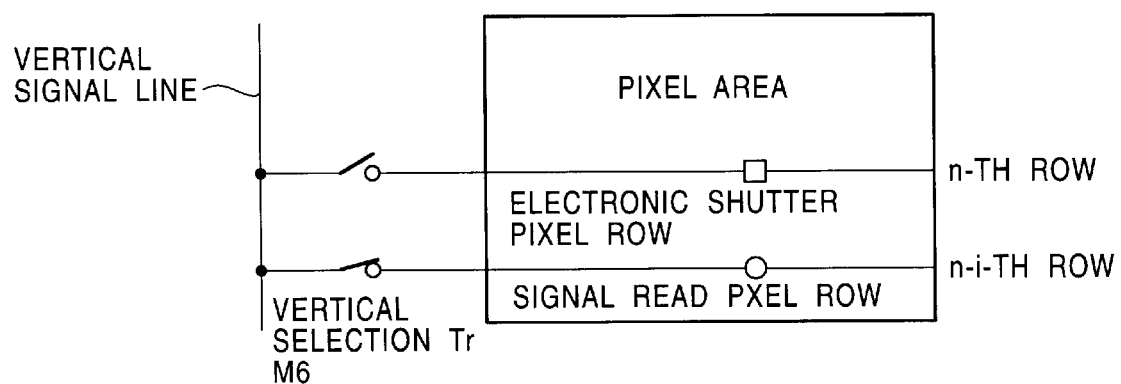
FIG. 5 is a diagram showing the scanning of the electronic shutter.
Figure 6:
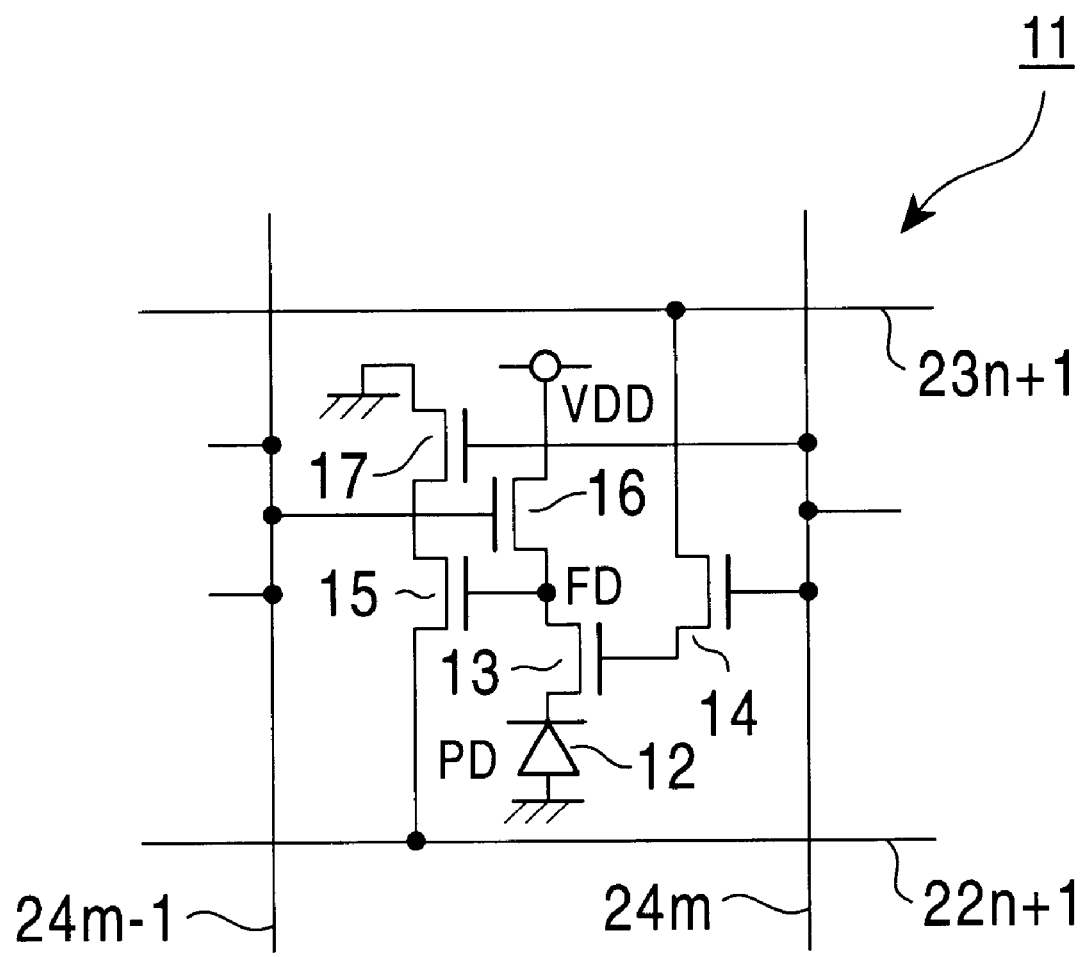
FIG. 6 is a circuit diagram showing the construction of a pixel of a modification of the first embodiment.

The pixel (m, n) is selected after a duration of time (1H×i) has been elapsed from the selection of the pixel (m, n-i). As understood from a timing diagram shown in FIG. 4, the storage time (exposure time=shutter speed) of the pixel (m, n) is 1H×i. FIG. 5 is a diagram showing the electronic shutter scanning with the (n-i)-th row treated as a signal read out pixel row and the n-th row treated as an electronic shutter pixel row.

During the operative state of the electronic shutter, as during the inoperative state of the electronic shutter, the reset levels and the signal levels of unit pixels 11 of one line at the (n-i)-th row are read out to the vertical signal line 25 through the same path on a point-at-a-time scanning basis. The levels are then converted from current to voltage through the I-V converter circuit 34 and are then sent to the CDS circuit 35 for noise canceling through correlated double sampling.

In the first embodiment, in the X-Y addressing type image pickup device having a matrix of unit pixels 11, each composed of the five transistors, the floating diffusion regions FD of the pixels 11 are reset on a row-by-row basis. The reset level is read out. The signal level based on the signal charge of the photodiode 12 is then read out. The reset levels and the signal levels are output through the same path on a point-at-a-time scanning basis. The CDS circuit 35 at the later stage can thus determine the difference between the reset level and the signal level. In this way, the fixed pattern noise due to variations in characteristics from unit pixel 11 to unit pixel 11 and reset noise (kTC noise) generated during a reset operation are thus controlled.

Allowing the horizontal scanning (selection) pulse φHm-1 at an (m-1)-column to serve as a reset pulse for the m-th column (adjacent pixels), there is no need for a dedicated reset line. The number of lines to the pixel assembly 21 is thus reduced. Since the single horizontal selection line 24m is connected to the gates of the read out selection transistor 14 and the output selection transistor 17 at the m-th column, and the reset transistor 16 at the (m+1)-th column, a single contact works for the three nodes of the three transistors.

This arrangement resolves the cross-talk problem that has been conventionally created during the electronic shutter operation. In the conventional art, the signals of the pixels are output through vertical signal lines wired on a column by column basis. A charge of the photodiode 12 at each pixel at a shutter pixel row is drained to the vertical signal line that reads out the signal from the pixel on a read out pixel row, thereby creating cross-talk.

In contrast, the X-Y addressing image pickup device of this embodiment outputs the signals of the pixels to the horizontal signal lines 22n and 22n+1 wired on a row-by-row basis. Since the charges in the photodiodes 12 in the pixels at the shutter pixel row are drained to a horizontal signal line separate from a horizontal signal line into which the signal charges from the pixels on a read out pixel row are read out, no cross-talk problem occurs.

In the unit pixel 11 of the first embodiment, the drain of the amplifying transistor 15 is coupled to the power source VDD, and the source thereof is connected to the horizontal signal line 22n+1 through the output selection transistor 17. Alternatively, the drain of the amplifying transistor 15 may be connected the horizontal signal line 22n+1 and the source thereof may be connected to ground through the output selection transistor 17, depending on the construction of the I-V converter circuit 34.

Figure 7:
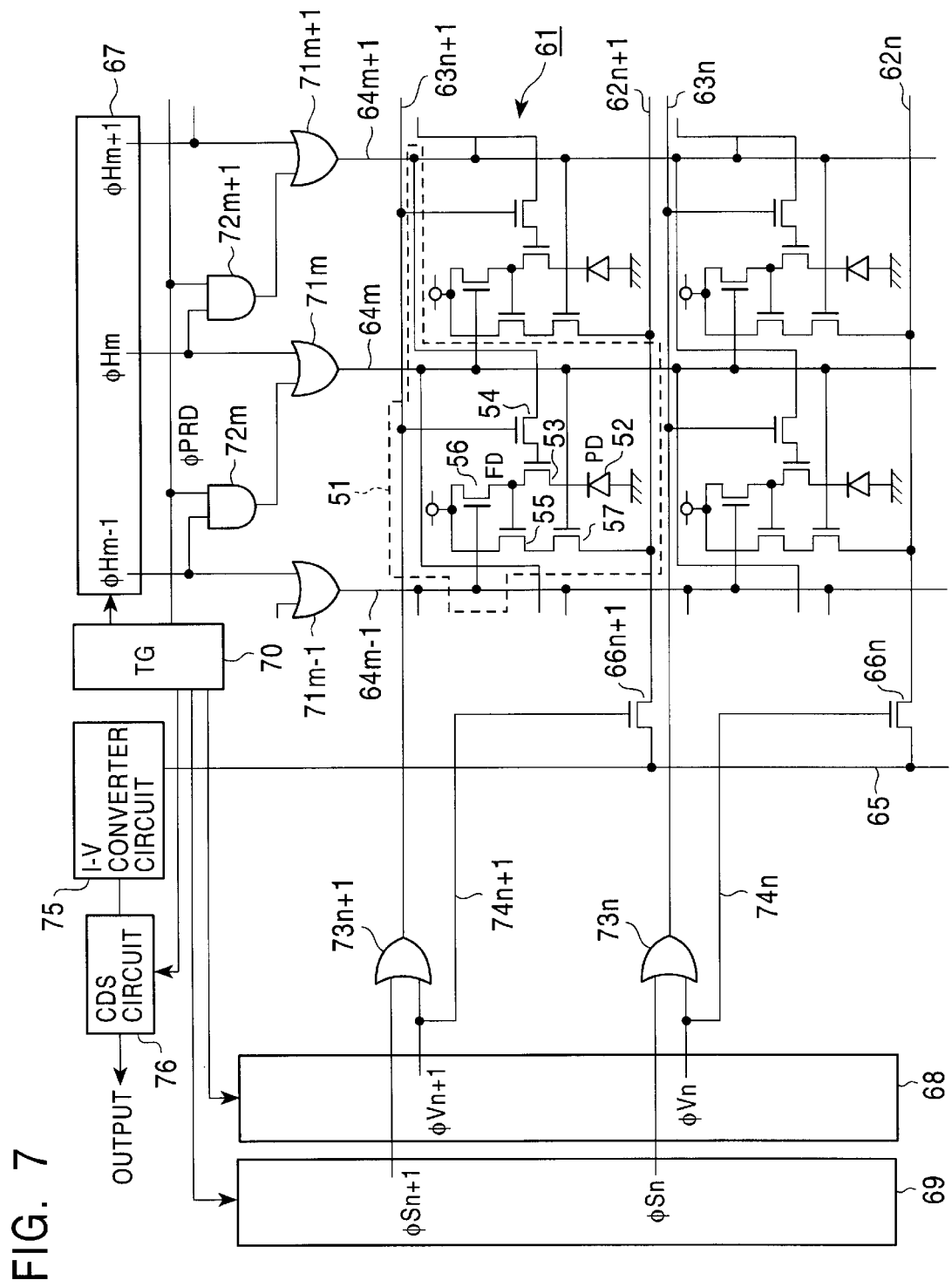
FIG. 7 is a block diagram showing a solid-state image pickup device of a second embodiment of the present invention.

FIG. 7 is a block diagram showing the solid-state image pickup device of a second embodiment of the present invention. The solid-state image pickup device of the second embodiment is an X-Y addressing type image pickup device having the electronic shutter function. The electronic shutter of the X-Y addressing type image pickup device is released on a row by row (line by line) basis, unlike a CCD (Charged Coupled Device).

Referring to FIG. 7, like the first embodiment, a unit pixel 57 includes a photodiode (PD) 52 as a photoelectric converter, and five N-channel MOS transistors of a read out transistor 53, a read out selection transistor 54, an amplifying transistor 55, a reset transistor 56, and an output selection transistor 57. The function of each transistor remains unchanged from that of each transistor in the first embodiment.

The unit pixels 51, arranged in a matrix, form a pixel assembly 61. For simplicity of the figure, the unit pixel 51 has a pixel arrangement of two columns (m-th column and (m+1)-th column) by two rows (n-th row and (n+1)-th row). The pixel assembly 61 includes horizontal signal lines 62n+1 and 62n and vertical/shutter selection lines 63n+1 and 63n on a row-by-row basis. Horizontal selection/read out/reset lines 64m-1, 64m and 64m+1 are wired on a column by column basis.

The unit pixel 51 of m-th column and (n+1)-th row has the same configuration of the first embodiment in which the read out transistor 53, the read out selection transistor 54, the amplifying transistor 55, the reset transistor 56, and the output selection transistor 57 are configured. The read out selection transistor 54 is configured with the source/drain thereof connected to the horizontal selection/read out/reset line 64m+1 at an adjacent (m+1)-th column, and the gate thereof connected to the vertical/shutter selection line 63n+1. The reset transistor 56 is configured with the gate thereof connected to the horizontal selection/read out/reset line 64m-1 at an adjacent (m-1)-th column.

A single vertical line 65 is wired in perpendicular to the two horizontal signal lines 62n and 62n+1. Vertical selection transistors 66n and 66n+1 are respectively arranged between the horizontal signal lines 62n and 62n+1 and the vertical signal line 55. The vertical selection transistors 66n and 66n+1 are also fabricated of N-channel MOS transistors.

Arranged in a peripheral portion of the pixel assembly 61 are a horizontal scanning circuit 67 for column selection, a vertical scanning circuit 68 for row selection, and an electronic shutter scanning circuit 69 for controlling a storage time (exposure time), which is an integer multiple of 1H. The scanning circuits 67, 68, and 69 are constructed of shift registers, for instance, and start shift operations (scanning) in response to a drive pulse provided by a timing generator (TG) 70.

The horizontal scanning circuit 67 successively outputs horizontal scanning (selection) pulses φHm-1, φHm, and φm+1. The horizontal scanning pulses φHm-1, φHm, and φHm are respectively fed to the inputs of OR gates 71m-1, 71m, and 72m+1, while being fed to the inputs of AND gates 72m, 72m30 1, and 72m+2. A read out pulse φPRD generated by the timing generator 70 is fed to the other inputs of the AND gates 72m, 72m+1, and 72m+2.

The outputs of the AND gates 72m, 72m+1, and 72m+2 are respectively fed to the other inputs of the OR gates 71m, 71m+1, and 71m+2. The outputs of the OR gates 71m-1, 71m, and 71m+1 are respectively applied to the horizontal selection/read out/reset lines 64m-1, 64m, and 64m+1. In the pixels on the m-th column, the read out selection transistor 54 receives the output of the OR gate 71m+1 at the drain thereof, the reset transistor 56 receives the output of the OR gate 71m-1 at the gate thereof, and the output selection transistor 57 receives the output of the OR gate 71m at the gate thereof.

The vertical scanning circuit 68 successively outputs vertical scanning pulses φVn and φVn+1, and the electronic shutter scanning circuit 69 successively outputs shutter pulses φSn and φSn+1. The vertical scanning pulses φVn and φVn+1 are respectively fed to the inputs of OR gates 73n and 73n+1 on a row-by-row basis, while respectively being fed to the gates of vertical selection transistors 66n and 66n+1 through vertical selection lines 74n and 74n+1.

The shutter pulses φSn and φSn+1 are fed to the other inputs of the OR gates 73n and 73n+1 on a row-by-row basis. The outputs of the OR gates 73n and 73n+1 are fed to the gates of the read out selection transistors 54 through vertical/shutter selection lines 63n and 63n+1.

Arranged on the output terminal of the vertical signal line 65 are an I-V converter circuit 75 and a CDS 76 as a differential circuit. The I-V converter circuit 75 converts the pixel signal supplied in the form of signal current through the vertical signal line 65 into a signal voltage and feeds the signal voltage to the CDS circuit 76. The CDS circuit 76 determines a difference between a noise level and a signal level, immediately subsequent to pixel resetting, in response to a sampling pulse provided by the timing generator 70. An AGC circuit or an ADC circuit may be connected to the CDS circuit 76 as a successive stage thereof, as necessary.

Figure 8:
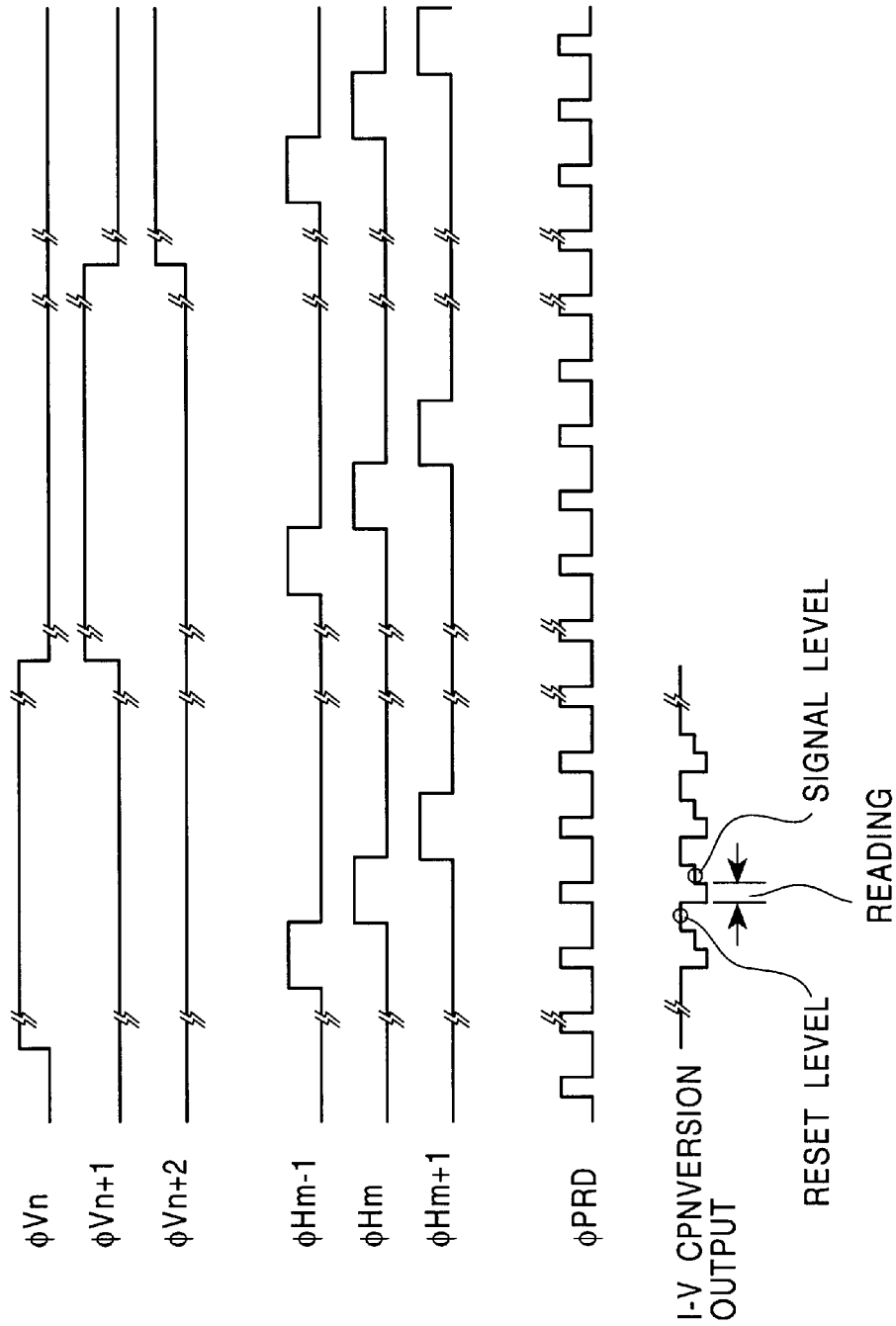
FIG. 8 is a timing diagram showing an electronic shutter in the inoperative state thereof in the solid-state image pickup device of the second embodiment.
Figure 9:
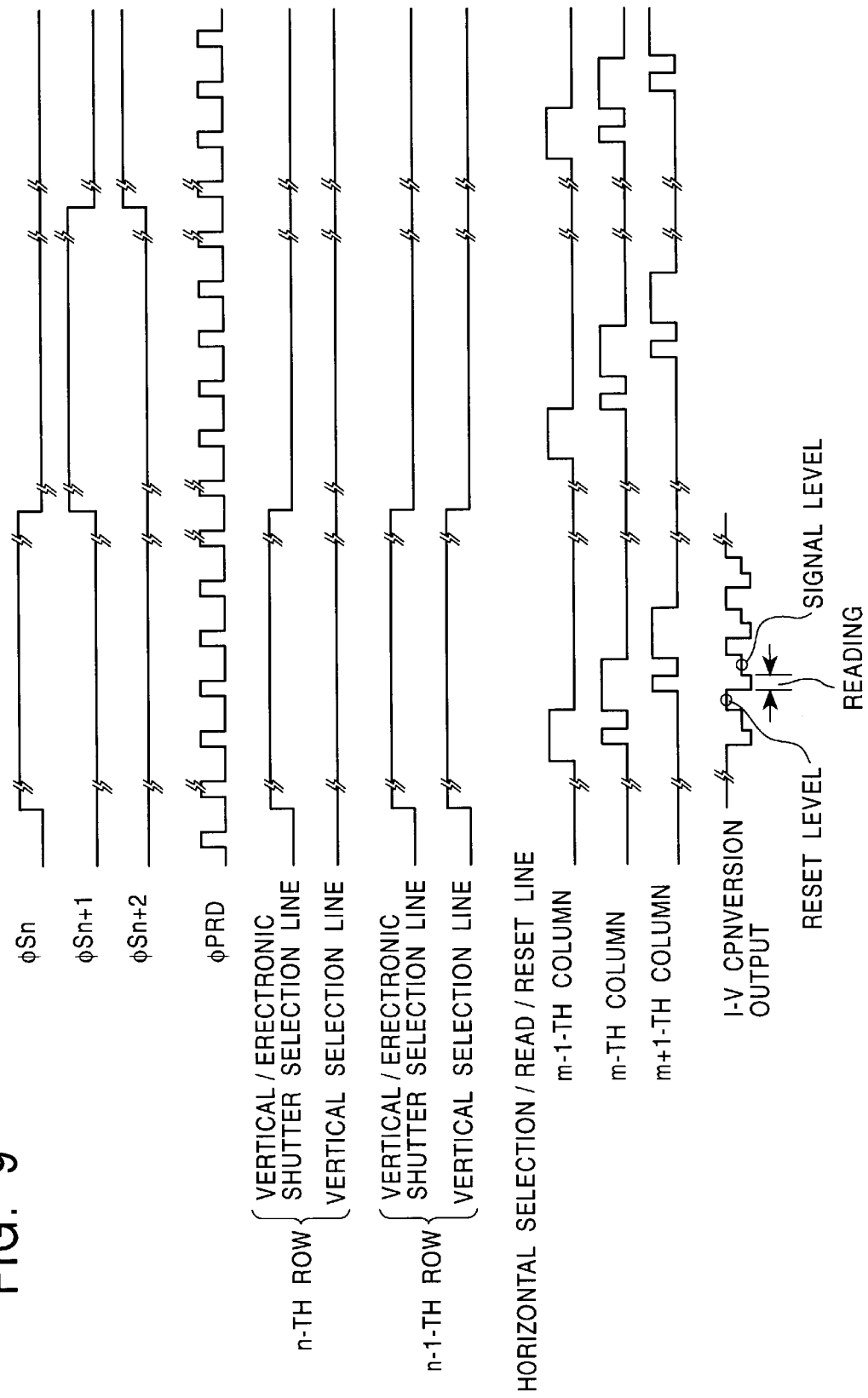
FIG. 9 is a timing diagram showing an electronic shutter in the operative state thereof in the solid-state image pickup device of the second embodiment.

The operation of the solid-state image pickup device of the second embodiment is now discussed, referring to timing diagrams shown in FIG. 8 and FIG. 9. FIG. 8 is the timing diagram with an electronic shutter in the inoperative state thereof. FIG. 9 is a timing diagram with the electronic shutter in the operative state thereof.

Focusing on the pixel at the m-th column and the n-th row with the electronic shutter in the inoperative state thereof, the vertical scanning circuit 68 outputs the vertical scanning pulse φVn in the vertical scanning operation thereof, thereby feeding the vertical scanning pulse φVn to the gate of the vertical selection transistor 66n at the n-th row. The vertical scanning pulse φVn is also fed to a vertical/shutter selection line 63n at the n-th row through the OR gate 73n. The n-th row is thus selected as a read out row.

In this state, the horizontal scanning circuit 67 outputs the horizontal scanning pulse φHm−1 in the horizontal scanning operation thereof, thereby outputting the horizontal scanning pulse φHm−1 to the horizontal selection/read out/reset line 64m−1 at the (m−1)-th column through the OR gate 71m−1. The reset transistor 56 at the adjacent m-th column is thus turned on. The floating diffusion region FD at the m-th column is thus reset to the power source VDD through the reset transistor 56. The horizontal scanning pulse φHm−1 at the (m−1)-th column thus functions as a reset pulse for the adjacent m-th column.

When the timing generator 70 outputs the read out pulse φPRD during the generation of the horizontal scanning pulse φHm−1, the NAND gate 72m NAND-gates the horizontal scanning pulse φHm−1 and the read out pulse φPRD, resulting in a pulse on the horizontal selection/read out/reset line 64m. *The output selection transistor 57 at a pixel (m, n) is temporarily turned on.* A pixel (m, n−1) is then being read out, and the succeeding CDS circuit 76 samples the reset level and the signal level for the pixel (m, n−1), and no problem will be presented in signal processing even if the reset level of the pixel (m, n) is output.

When the horizontal scanning circuit 67 outputs the horizontal scanning pulse φHm to the horizontal selection/read out/reset line 64m at the m-th column through the OR gate 71m, the output selection transistor 57 at the pixel (m, n) is turned on. In this way, a current, responsive to a result level of the pixel (m, n) reset is thus output through the horizontal signal line 62n and the vertical selection transistor 66n to the vertical signal line 65.

The horizontal scanning pulse φHm is AND-gated with the read out pulse φPRD output by the timing generator 70. The read out pulse φPRD is output during the generation of the horizontal scanning pulse φHm, and is thus applied to the horizontal selection/read out/reset line 64m+1 through the AND gate 72m+1 and the OR gate 71m+1.

The read out pulse φPRD applied to the horizontal selection/read out/reset line 64m+1 is applied to the gate of the read out transistor 53 through the drain-source of the read out selection transistor 54 at the pixel (m, n). The read out transistor 53 is thus turned on, and the signal charge generated and stored by the photodiode 52 through photoelectric conversion is read out into the floating diffusion region FD through the read out transistor 53.

When the read out pulse φPRD ends, the read out transistor 53 is turned off. The signal charge, read out into the floating diffusion region FD, is amplified by the amplifying transistor 55 into a signal current. The signal current is then output to the vertical signal line 65 through the output selection transistor 57, the horizontal signal line 62n, and the vertical selection transistor 66n.

During the selection of the pixel (m, n), the pixel (m+1, n) at the next column is reset by the horizontal scanning pulse φHm. When the vertical scanning pulse φHm ends, followed by the output of the horizontal scanning pulse φHm+1 from the horizontal scanning circuit 67, the pixel (m+1, n) at the next column is selected.

Through the series of steps discussed above, the reset levels and the signal levels of unit pixels 51 of one line at the n-th row are read out to the vertical signal line 65 through the same path (composed of the horizontal signal line 62n and the vertical selection transistor 66n) on a point-at-a-time scanning basis. The levels are then converted from current to voltage through the I-V converter circuit 75 and are then sent to the CDS circuit 76 for noise canceling through correlated double sampling.

Referring to the timing diagram shown in FIG. 9, the electronic shutter operation is discussed, with the pixels at the n-th row being treated as electronic shutter pixels and the pixels at the (n-i)-th row being treated as a selected pixel row (a signal read out pixel row). The storage time of each pixel at the n-th row is 1H×i.

The electronic shutter scanning circuit 69 outputs the shutter pulse φS. The shutter pulse φS is applied to the vertical/shutter selection line 63n at the n-th row through the OR gate 73n. No pulse appears on the vertical selection line 74n at the n-th row. The vertical scanning circuit 68 outputs a vertical scanning pulse φVn-i to the gate of a vertical selection transistor 66n-i at an (n-i)-th row.

In this state, the horizontal scanning circuit 67 in the scanning operation thereof outputs a horizontal scanning pulse φHm−1 to the horizontal selection/read out/reset line 64m−1 at the (m−1)-th column, through the OR gate 71m. The reset transistor 56 at the m-th column is turned on. In this way, the floating diffusion region FD in each pixel is reset to the power source VDD through the reset transistor 56.

In succession, the horizontal scanning circuit 67 outputs a horizontal scanning pulse φHm to the horizontal selection/read out/reset line 64m at the m-th column through the OR gate 71m. The output selection transistors 57 at the m-th column are turned on. A current, responsive to a reset level of the pixel (m, n-i) reset, is output to the vertical signal line 65 through the horizontal signal line 62n-i and the vertical selection transistor 66n-i.

Since the vertical selection transistor 66n at the n-th row remains off, a current responsive to the reset level of the pixel (m, n) is not output to the vertical signal line 65.

The horizontal scanning pulse φHm is AND-gated with the read out pulse φPRD output by the timing generator 70. The read out pulse φPRD is output during the generation of the horizontal scanning pulse φHm, and is thus applied to the horizontal selection/read out/reset line 64m+1 through the AND gate 72m+1 and the OR gate 71m+1.

The read out pulse φPRD applied to the horizontal selection/read out/reset line 64m+1 is applied to the gate of the read out transistor 53 through the drain-source of the read out selection transistors 54 at the pixel (m, n) and at the pixel (m, n−1). The read out transistor 53 is thus turned on, and the signal charge generated and stored by the photodiode 52 through photoelectric conversion is read out into the floating diffusion region FD through the read out transistor 53.

When the read out pulse φPRD ends, the read out transistor 53 at each of the pixel (m, n) and the pixel (m, n−1) is turned off. The signal charge, read out into the floating diffusion region FD at the pixel (m, n−1), is amplified by the amplifying transistor 55 into a signal current. The signal current is then output to the vertical signal line 65 through the output selection transistor 57, the horizontal signal line 62n-i, and the vertical selection transistor 66n-i.

Since the vertical selection transistor 66n at the n-th row remains off, a current responsive to the reset level of the pixel (m, n) is not output to the vertical signal line 65. The signal charge stored in the photodiode 52 at the pixel (m, n) is transferred to the floating diffusion region FD and is thus emptied, and a new charging starts over.

During the selection of the pixel (m, n-i), a pixel (m+1, n-i) at the next column is reset by the horizontal scanning pulse φHm. When the horizontal scanning pulse φHm ends, followed by the output of the horizontal scanning pulse φHm+1 by the horizontal scanning circuit 67, the pixel (m+1, n-i) at the next column is selected. The pixel (m, n) is selected after a duration of time (1H×i) has been elapsed from the selection of the pixel (m, n-i).

During the operative state of the electronic shutter, as during the inoperative state of the electronic shutter, the reset levels and the signal levels of unit pixels 51 of one line at the (n-i)-th row are read out to the vertical signal line 65 through the same path on a point-at-a-time scanning basis. The levels are then converted from current to voltage through the I-V converter circuit 75 and are then sent to the CDS circuit 76 for noise canceling through correlated double sampling.

In the second embodiment, in the X-Y addressing type image pickup device having a matrix of unit pixels 51, each composed of the five transistors, the floating diffusion regions FD of the pixels 51 are reset on a row-by-row basis. The reset level is read out. The signal level based on the signal charge of the photodiode 52 is then read out. The reset levels and the signal levels are output through the same path on a point-at-a-time scanning basis. The CDS circuit 76 at the later stage can thus determine the difference between the reset level and the signal level. In this way, the fixed pattern noise due to variations in characteristics from unit pixel 51 to unit pixel 51 and reset noise (kTC noise) generated during a reset are thus controlled.

Allowing the horizontal scanning (selection) pulse φHm−1 at an (m−1)-column to serve as a reset pulse for the m-th column (adjacent pixels), there is no need for a dedicated reset line. The number of lines to the pixel assembly 61 is thus reduced. Since the single horizontal selection/read out/reset line 64m is connected to the gates of the output selection transistor 57 at the m-th column, the reset transistor 56 at the (m+1)-th column, and the drain/source of the read out selection transistor 54 at the (m−1)-th column, a single contact works for the three nodes of the three transistors. This arrangement provides space advantage. For the same reason as in the first embodiment, no cross-talk occurs in the operation of the electronic shutter.

Figure 10:
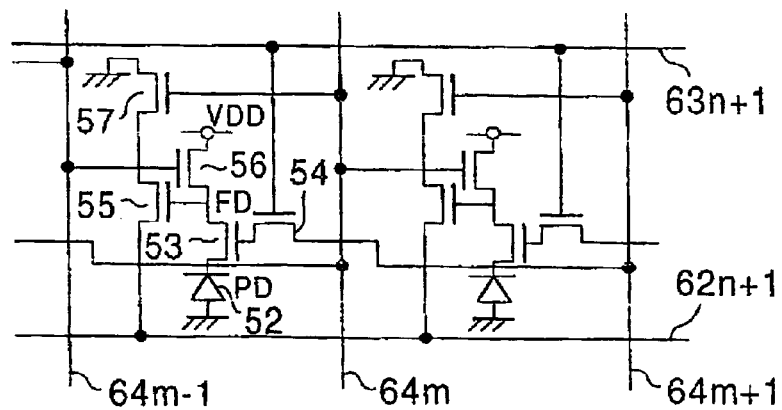
FIG. 10 is a circuit diagram showing the construction of a pixel of a modification of the second embodiment.
Figure 11:
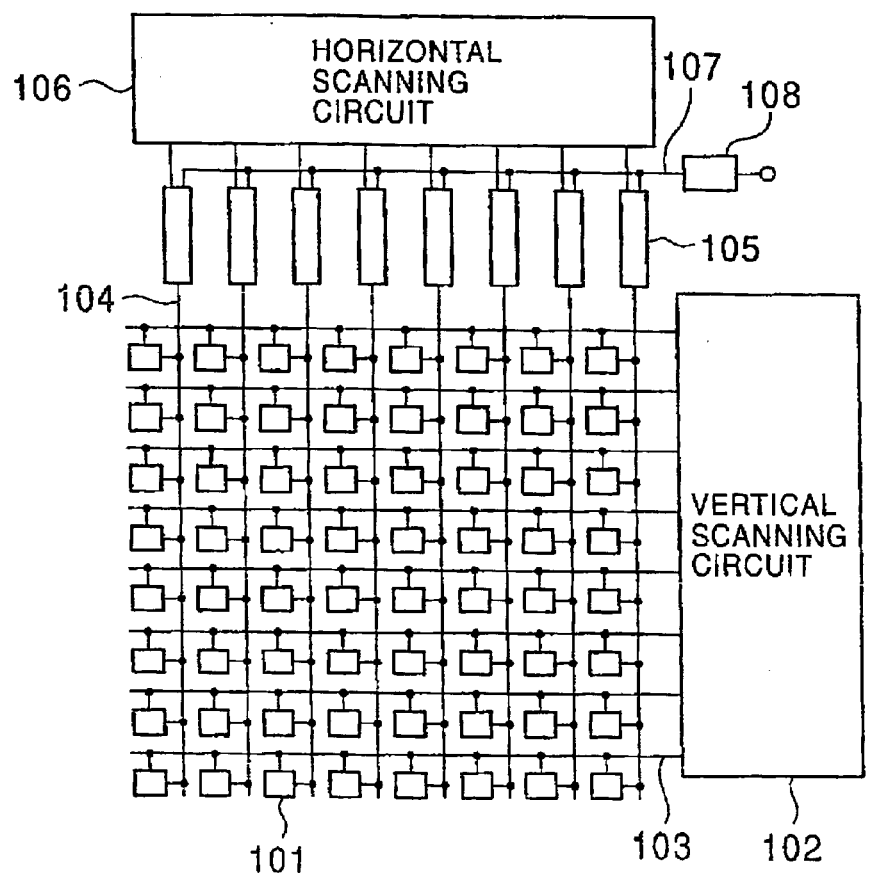
FIG. 11 is a block diagram roughly showing the construction of a conventional art.

In the unit pixel 51 of the second embodiment, the drain of the amplifying transistor 55 is coupled to the power source VDD, and the source thereof is connected to the horizontal signal line 62n+1 through the output selection transistor 57. Alternatively, as shown in FIG. 10, the drain of the amplifying transistor 55 may be connected to the horizontal signal line 62n+1 and the source thereof may be connected to ground through the output selection transistor 77, depending on the construction of the I-V converter circuit 75.

The solid-state image pickup device of the present invention includes a matrix of unit pixels, each composed of five transistors, a plurality of horizontal signal lines arranged for unit pixels on a row-by-row basis, and a single vertical signal line arranged commonly for the plurality of the horizontal signal lines. The reset transistor resets the storage unit. The reset level is then output to the horizontal signal line through the amplifying transistor, and the signal charge in the electrooptical converter is read out into the storage unit. The signal level based on the signal charge is output to the horizontal signal line through the amplifying transistor. The reset level and the signal level are thus output through the same path on a point-at-a-time scanning basis. The output circuit determines a difference between the reset level and the signal level. The fixed pattern noise due to the variations in the characteristics from unit pixel to unit pixel and the reset noise generated during the reset are thus controlled without the need for the noise cancelling circuit using the frame memory external to the device. A camera system using the solid-state image pickup device is thus miniaturized.

What is claimed is:

1. A solid-state image pickup device comprising:
   a pixel assembly comprising a matrix of unit pixels, each unit pixel comprising a photoelectric converter, a read out transistor for reading out a signal charge, acquired by the photoelectric converter, into a storage unit, a read out selection transistor for selecting the reading out of the signal charge by the read out transistor, an amplifying transistor for converting the signal charge stored in the storage unit into an electrical signal and for outputting the electrical signal as a pixel signal, a reset transistor for resetting the storage unit, and an output selection transistor for selecting the output of the pixel signal provided by the amplifying transistor;
   a plurality of horizontal rows of signal lines wired in the pixel assembly;
   a single vertical signal line disposed on a side of an area of the pixel assembly and wired commonly to the plurality of the horizontal rows of the signal lines;
   vertical drive means for selecting pixels on a row-by-row basis in the pixel assembly, and for successively outputting, to the vertical signal line, the pixel signals, which are output from the pixels in the pixel assembly to the plurality of horizontal rows of the signal lines; and
   horizontal drive means which feeds a horizontal selection pulse to the read out selection transistor and the output selection transistor while feeding a reset pulse to the reset transistor.

2. A solid-state image pickup device according to claim 1, wherein the horizontal selection pulse also serves as a reset pulse for an adjacent pixel in the direction of columns.

3. A solid-state image pickup device according to claim 1, wherein the unit pixel outputs a reset level by the reset transistor during a reset operation and a signal level based on the signal charge photoelectrically converted by the photoelectric converter.

4. A solid-state image pickup device according to claim 1, further comprising a differential circuit for determining a difference between the reset level and the signal level.

5. A solid-state image pickup device according to claim 4, wherein the differential circuit is a correlated double sampling circuit.

6. A solid-state image pickup device according to claim 1, further comprising an electronic shutter scanning circuit that performs a shutter operation on a row-by-row basis prior to the selection of the row by the vertical drive means.

7. A method for driving a solid-state image pickup device comprising a pixel assembly comprising a matrix of unit pixels, each unit pixel comprising a photoelectric converter, a read out transistor for reading out a signal charge, acquired by the photoelectric converter, into a storage unit, a read out selection transistor for selecting the reading out of the signal charge by the read out transistor, an amplifying transistor for converting the signal charge stored in the storage unit into an electrical signal and for outputting the electrical signal as a pixel signal, a reset transistor for resetting the storage unit, and an output selection transistor for selecting the output of the pixel signal provided by the amplifying transistor, a plurality of horizontal rows of signal lines wired in the pixel assembly, and a single vertical signal line disposed on a side of an area of the pixel assembly and wired commonly to the plurality of the horizontal rows of the signal lines, the method comprising the steps of:

resetting the storage unit by the reset transistor;

outputting a reset level of the reset transistor to the horizontal row of the signal line through the amplifying transistor;

reading out the signal charge of the photoelectric converter into the storage unit;

outputting a signal level based on the signal charge to the horizontal row of the signal line through the amplifying transistor; and outputting the reset level and the signal level to the vertical signal line through the horizontal row of the signal line on a point-at-a-time scanning manner.

* * * * *